Nov. 10, 1964  H. M. HARVEY ETAL  3,156,260
BALL TYPE MIXING AND VOLUME CONTROL VALVE
Filed July 19, 1961  2 Sheets-Sheet 1

INVENTORS.
HOMER M. HARVEY
DALE H. HART
BY

Wm. H. Maxwell

AGENT

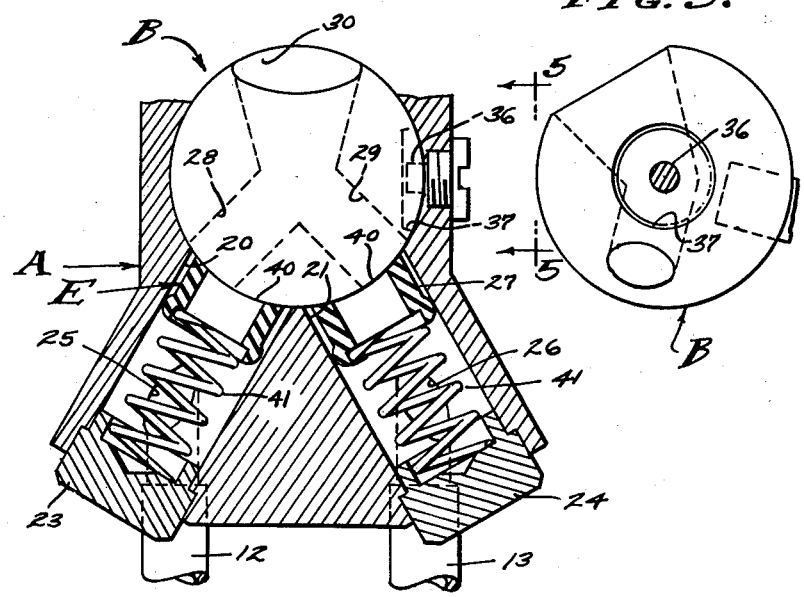
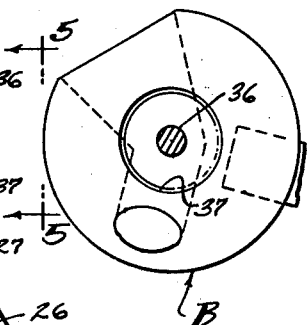
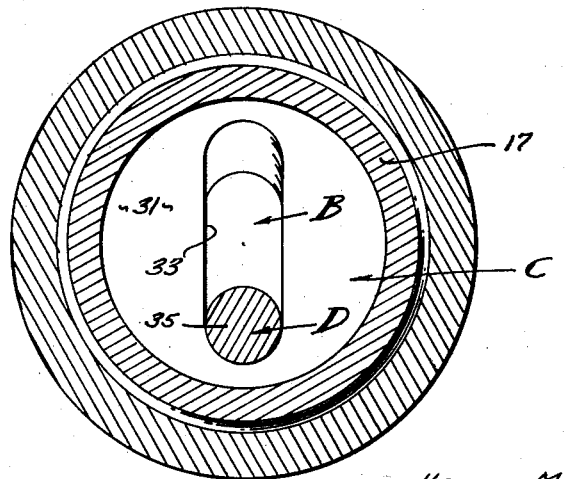
INVENTORS.
HOMER M. HARVEY
DALE H. HART
BY
AGENT 3,156,260
BALL TYPE MIXING AND VOLUME
CONTROL VALVE
Homer M. Harvey, Los Angeles, and Dale H. Hart, Long Beach, Calif., assignors to Harvey Aluminum (Incorporated), Torrance, Calif., a corporation of California
Filed July 19, 1961, Ser. No. 128,327
2 Claims. (Cl. 137—625.41)

This invention relates to a ball type valve having the dual functions of both mixing and volume control, and is primarily concerned with a single control valve that governs both mixing and volume of delivery of fluid from the valve, the said mixing being made between a pair of fluid inlet lines.

Ball type valves are common and have utility in mixing valves wherein fluid from two separate lines is to be controlled as to proportionate flow and wherein fluid stoppage is also desired. Various structures have been resorted to, involving rather complex configurations of the ball and complex means to limit movements of the ball. Also, sealing at the fluid inlet ports is a problem not too satisfactorily resolved. Generally, the prior art teaches balls of complex shape, difficult guiding arrangements for controlling the movements of the ball, and inadequate sealing arrangements at the inlet ports and around the control stem that projects from the ball.

The present invention employs the widely used Y passage in the ball, with improved relationship and disposition of the three portions of the Y. The control stem of the valve is cooperatively related to the ball retaining the seal, so as to limit movement of the ball in one plane, there being a lug to limit rotational movement of the ball at any position within the first mentioned limits. Further, the inlet seals are spring biased with spring seats axially aligned with the seals but arranged independent of the fluid inlet passages.

A general object of this invention is to provide an improved mixing valve of the ball type wherein a Y passage is used, and a valve wherein disposition of the passage portions results in economy of manufacture, simplicity of assembly and ease of installation of replacement parts.

An object of this invention is to provide a mixing and control valve of the ball type wherein the retaining element for the ball is a multi-purpose element, namely an element that retains the ball, resiliently biases the ball into the seat provided therefor, and to guide and limit movement of the control stem projecting from the valve for manipulation.

Another object of this invention is to provide improved and reliable seals in a ball type mixing valve, and seals that can be positioned independently of the fluid inlet passages, and seals that are readily and easily replaceable.

The various objects and features of this invention will be fully understood from the following detailed description of the typical preferred form and application thereof, throughout which description reference is made to the accompanying drawings, in which:

FIG. 3 is an enlarged sectional view of a portion of the structure and taken as indicated by line 3—3 on FIG. 1.

FIG. 4 is an enlarged sectional view taken as indicated by line 4—4 on FIG. 1.

FIG. 5 is a side view of the ball valve element and taken as indicated by line 5—5 on FIG. 3.

Figure 1:
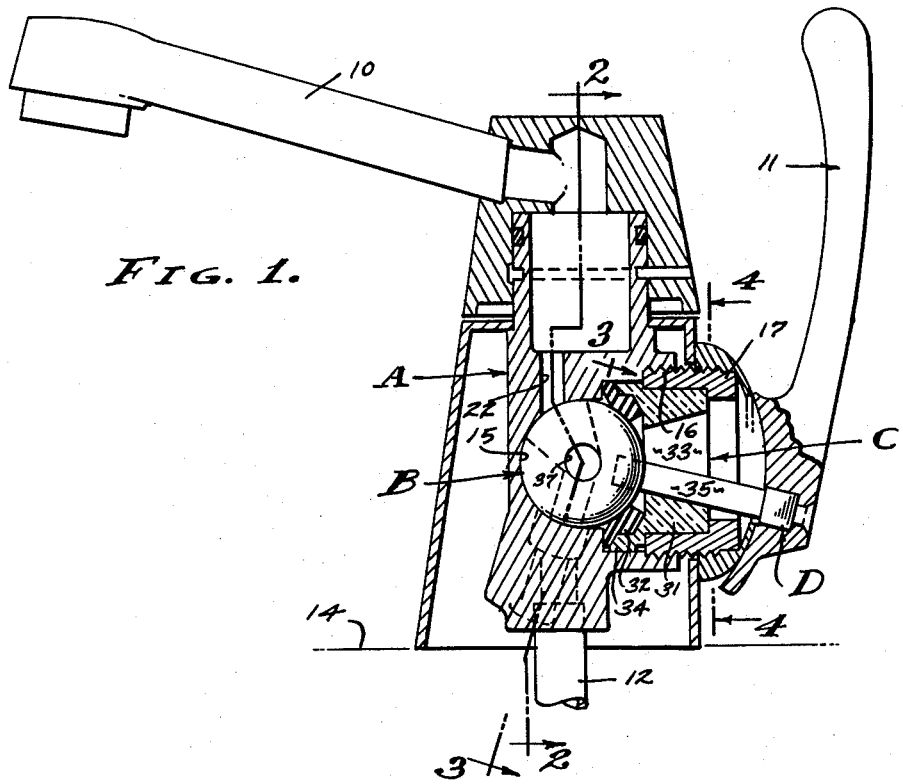
FIG. 1 is a sectional view taken transversely through the valve structure of the present invention.
Figure 2:
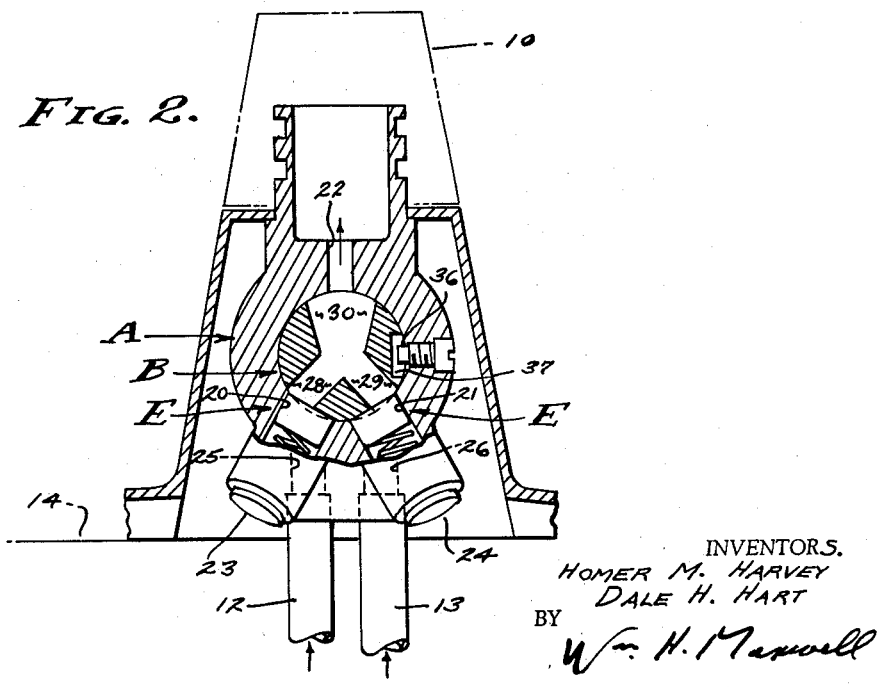
FIG. 2 is a sectional view taken substantially as indicated by line 2—2 on FIG. 1.

The ball type valve herein disclosed is a faucet fixture, preferably a domestic fixture for use in drawing water for a sink or the like. In the drawings we have shown a typical embodiment of the present invention wherein the fixture involves, generally, a body A, a ball valve B, a retainer C, a control D, and a seal E at each inlet of the valve. The body A is a cast or fabricated metal part machined to have the features hereinafter described. The ball B is a simple sphere with a Y shaped passage therein. The retainer C has a three-fold purpose of ball retention, ball biasing and ball movement control. The control D is coupled directly to the ball and it cooperates with the retainer C, and it includes a lug to limit rotational movement of the ball. And, the seals E are independently accessible parts that are easily replaced when and if necessary.

The body A that we have shown is fabricated for construction of a deck-type fixture, and said fixture is shown having a swing spout 10 rotatable on a vertical axis. In the case illustrated, the fixture is controlled by a laterally disposed manually operable handle 11, this handle projecting upwardly from the back side of the fixture. One or more fluid inlet lines 12 and 13 supply water (hot or cold) to the underside of the body A, from beneath the deck 14 upon which the fixture is suitably installed.

The body A is characterized by its semi-spherical seat 15 and its laterally opening bore 16 on an axis intersecting the center of the seat. The bore 16 is threaded to receive a nut 17 used to secure the retainer C in position as later described. It is significant that the seat 15 is a semi-sphere, since all porting is made within this semi-spherical area. As shown, there is a pair of inlet ports 20 and 21 entering the lower portion of the seat 15, and these two ports are on radial axes diverging, as shown, 60° from the center plane of the structure so that there is a divergence of 120° between the axes thereof. Said axes of the ports 20 and 21 are in a common transverse plane disposed radially from the center of the seat at an angle of about 15°, in a forwardly direction. Also, there is a single delivery port 22 opening at the seat and positioned centrally and disposed upwardly about 135° from the plane of the ports 20 and 21. The port 22 is in open communication with the swing spout 10 which is swivelly coupled to the upper end of the body A in a suitable manner.

In accordance with the invention, the ports 20 and 21 extend through the body A to open at the outer wall of the body, these two ports being machined as by drilling from the outside of the body and toward the center of the seat 15. The ports, after the drill penetration, are closed by caps 23 and 24 which form spring seats for the seals E, later described. Further, the fluid lines 12 and 13 communicate with fluid inlet passages 25 and 26 that enter the body A near the central axis thereof and open into the ports 20 and 21, as clearly shown in FIG. 3, above the caps and spaced substantially radially outward from the seat 15.

The ball valve B is a full sphere characterized by its Y-shaped passage with three drilled portions corresponding generally to the disposition of the ports 20, 21 and 22, above described. That is, the Y passage (inverted) has a pair of divergent portions 28 and 29 on axes spaced 90° apart and in a plane at an angle of about 15°. Also, there is a single delivery portion 30 disposed upwardly about 135° from the plane of the portions 28 and 29. The portion 30 is substantially larger in cross-section than the port 22, preferably cone-shaped, all of the ports being round, in order to allow for movement of the ball rotatably about its center without affecting delivery through the port 22. However, it is apparent that rotation of the ball B affects flow through the ports 20 and 21 by eclipsing the same with the portions 28 and 29 of the Y passage. By rotating the ball on a horizontal transverse axis, the volume and/or total stoppage of fluid is gained. By rotating the ball on a normally horizontal axis normal to the first mentioned axis of rotation and coincidental with the movable stem 35, the differential volume from the two ports 20 and 24 is gained.

The retainer C is a multi-purpose element and according to its purpose is made of a firm body of material having resiliency. It is preferred that "nylon" be used in the formation of the retainer C, which is a plug-shaped element adapted to occupy the bore 16 and to be retained by the nut 17, and that rubber or the like, be used in the formation of the retainer C. As shown, the retainer C is sectional having a plug section 31 and a seal section 32. The plug section 31 has a guide opening 33 extending therethrough, there being a key 34 to rotatably position said plug. The opening 33 is slot-shaped and it is disposed in a vertical plane radially of the central axis of the body A. The seal section 32 is of soft pliant rubber, positioned by and pressed into engagement with the ball B by the inner end of the plug section 31 where the section 32 is seated as shown. There is room for the seal 32 to expand and thereby exert a pressure in order to bias the ball into engagement with the seat 15, said seal section 32 being an annular part with a spherically concaved face engaged with the back side of the ball rearwardly of the seat 15. Thus, the seal section 32 is held in place by the plug section 31 and so as to press against the ball B.

The control D involves a stem 35 that projects radially from the ball B so as to pass through the slot-shaped opening 33. The stem 35 is rigidly secured into the ball and has a squared end for engagement with the handle 11. It will be apparent that the opening 33 directs the stem to swing in a vertical plane whereby the ball rotates on said horizontal transverse axis. Further, it will be apparent that the stem 35 can be revolved by movement of the handle 11 in a plane normal to the first mentioned plane of movement whereby the ball rotates correspondingly. As a result of the foregoing movements, the ball B can be positioned to vary mixture as well as volume. In practice, a lug 36 is provided to limit rotation of the ball B, said lug 36 projecting inwardly from the body A to enter an elongate recess 37 in the ball. The recess 37 is preferably round and the lug 36 and center of the recess 37 are at the horizontal transverse axis of rotation when the recess is normally vertically disposed, and the ends or perimeter of the recess engage the lug in order to limit movement of the ball. Consequently, the said transverse axis is at times disposed other than horizontally, since the handle 11 can be revolved, as above described.

The seals E are alike, there being a seal E at each port 20 and 21. The seal E is a sleeve-shaped port with a spherically concave end face 40 to slidably engage the surface of the ball B. The seal E is made of rubber or the like, to conform with the surface of the ball B. The exterior of the sleeve slidably engages in the port 20 or 21 that it occupies and it has a bore therethrough conforming approximately in size or diameter to the passage 28 or 29 opening into the ball B with which it is to cooperate. A spring 41, preferably a helical compression spring, urges the sleeve seal E into pressure engagement with the ball B.

From the foregoing it will be apparent that the valve of the present invention is characterized by a few simple and easily manufactured parts, that said valve is reliable and that the seals thereof are readily and easily replaced. In order to replace the seals E it is merely necessary to remove the retainer C whereupon the entire ball-shaped valve B is removable from the seat 15. Removal of the ball valve B exposes the seals E which are then replaceable and after which the valve structure is re-assembled, all from the rear of the structure and without encumbering the appearance of the valve or faucet fixture.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:

1. A valve adapted to selectively mix flow from a pair of fluid supply lines comprising a valve body having a horizontally faced, semi-spherical seat and having a pair of inlet passages and an outlet passage therein, one end of each of said passages opening into the seat to form spaced inlet and outlet ports therein; a complementary ball element having one side engaged by said seat and formed with a generally Y-shaped internal passage which terminates in three space ports on the periphery of said ball element, each of said ports in the periphery of said ball element being disposed for fluid communicating registration with a respective one of said inlet and outlet ports in said seat whereby when said ball element is rotated about a first axis the two inlet ports therein can selectively be brought into fluid communicating registration with their respective inlet ports in said seat so as to control the ratio of the two inlet fluids appearing in the outlet port and when said ball element is rotated about a second axis perpendicular to said first axis said two inlet ports therein are brought into or out of fluid communicating registration with their respective inlet ports in said seat so as to control the total quantity of fluid delivered from said inlet passages in said seat to said outlet passage in said seat; said ball element and said seat being arranged so that the passages and the ports in said seat and the passage and ports in said ball element all lie on one side of a vertical plane through the center of said ball element; a removable retainer secured to said body on the other side of said vertical plane and having a vertically extending narrow guide slot therein, said retainer including resilient seal means engaging said ball element and said body and further including means threadedly received in said body and urging said seal means into sealing engagement with both said body and siad ball element; a stem extending generally horizontally with its axis coinciding with said first axis, said stem being of substantially the same width as said narrow guide slot and secured to said other side of said ball element passing through said guide slot whereby movement of said stem along said slot causes the ball element to rotate about said second axis and whereby revolving said stem in said guide slot causes rotation of said ball element about said first axis and means for limiting the rotation of said ball element.

2. The mixing valve defined in claim 1 wherein the inlet and outlet ports in said seat are spaced from the sealing means whereby said sealing means is subject to a fluid pressure which is substantially less than the pressure in said passages in said seat; and the inlet passages in said seat being provided with ball element sealing means.

References Cited by the Examiner

UNITED STATES PATENTS

| | | | |
|---|---|---|---|
| 1,451,588 | 4/23 | Reidt | 251—188 |
| 1,614,437 | 1/27 | Cochran | 137—625.41 |
| 1,661,431 | 3/28 | Leibing | 137—625.41 X |
| 2,535,580 | 12/50 | Kersten | 137—625.41 |
| 2,845,949 | 8/58 | Parker | 137—625.41 |
| 2,930,575 | 3/60 | Britton | 251—315 X |
| 3,056,418 | 10/62 | Adams et al. | 137—625.41 XR |

M. CARY NELSON, *Primary Examiner.*

MARTIN P. SCHWADRON, LAVERNE D. GEIGER,
*Examiners.*